US008909055B2

(12) United States Patent
Kawaida et al.

(10) Patent No.: US 8,909,055 B2
(45) Date of Patent: Dec. 9, 2014

(54) RELAY DEVICE AND SPEAKER APPARATUS

(75) Inventors: Yoshiaki Kawaida, Hamamatsu (JP);
Koji Suzuki, Hamamatsu (JP);
Takamori Shimazu, Hamamatsu (JP);
Masaki Yamamoto, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 99 days.

(21) Appl. No.: 13/476,361

(22) Filed: May 21, 2012

(65) Prior Publication Data

US 2012/0293722 A1     Nov. 22, 2012

(30) Foreign Application Priority Data

May 20, 2011   (JP) ................................. 2011-112971

(51) Int. Cl.
*H04B 10/00* (2013.01)
*G08C 23/04* (2006.01)
*H04B 10/114* (2013.01)

(52) U.S. Cl.
CPC ............ *H04B 10/1141* (2013.01); *G08C 23/04* (2013.01); *G08C 2201/40* (2013.01)
USPC ........... 398/106; 398/113; 398/173; 398/178; 398/180

(58) Field of Classification Search
CPC ................. G08C 23/04; H04B 10/291; H04B 2203/5433; H04B 2203/5479
USPC ......... 398/106, 107, 118, 130, 212, 110, 113, 398/114, 173, 178, 180
See application file for complete search history.

(56) References Cited

U.S. PATENT DOCUMENTS

| 5,392,313 | A |   | 2/1995  | Noro      |         |
|-----------|---|---|---------|-----------|---------|
| 5,495,357 | A | * | 2/1996  | Osterhout | 398/107 |
| 5,808,760 | A | * | 9/1998  | Gfeller   | 398/27  |
| 5,822,099 | A | * | 10/1998 | Takamatsu | 398/162 |

(Continued)

FOREIGN PATENT DOCUMENTS

| CN | 1382266 A   | 11/2002 |
|----|-------------|---------|
| CN | 101114881 A | 1/2008  |

(Continued)

OTHER PUBLICATIONS

Extended European Search Report dated Sep. 27, 2012 (five (5) pages).

(Continued)

*Primary Examiner* — Daniel Washburn
*Assistant Examiner* — Hibret Woldekidan
(74) *Attorney, Agent, or Firm* — Crowell & Moring LLP

(57) ABSTRACT

A relay device includes: a housing including: a first surface; and a second surface which is different from the first surface; a light signal receiving element operable to receive a light signal from outside, the light signal receiving element provided at the first surface of the housing; a light emission element operable to emit light responsive to the light signal received by the light signal receiving element; and a longitudinally elongated light guide member provided at the second surface of the housing, the light guide member to which the light emitted from the light emission element is incident, the light guide member including an emission part which causes the incident light to be emitted to outside from a lateral surface of the light guide member, the lateral surface which extends along a longitudinal direction of the light guide member.

9 Claims, 5 Drawing Sheets

(56) References Cited

U.S. PATENT DOCUMENTS

| | | | |
|---|---|---|---|
| 6,647,211 B2* | 11/2003 | Terahara et al. | 398/106 |
| 6,663,247 B1* | 12/2003 | Uno et al. | 359/874 |
| 7,436,288 B2* | 10/2008 | Shin | 340/12.32 |
| 7,809,274 B2* | 10/2010 | Wu | 398/130 |
| 7,929,863 B2* | 4/2011 | Yu | 398/113 |
| 8,295,707 B2* | 10/2012 | Wu | 398/131 |
| 8,335,436 B2* | 12/2012 | Machida | 398/131 |
| 2004/0131357 A1* | 7/2004 | Farmer et al. | 398/67 |
| 2007/0229299 A1* | 10/2007 | Suzuki | 340/825.69 |
| 2009/0166537 A1* | 7/2009 | Fukui et al. | 250/338.1 |
| 2010/0158533 A1 | 6/2010 | Belz et al. | |
| 2012/0001738 A1 | 1/2012 | Hilgers | |

FOREIGN PATENT DOCUMENTS

| | | |
|---|---|---|
| CN | 201203947 Y | 3/2009 |
| CN | 201270589 Y | 7/2009 |
| EP | 1 862 984 A2 | 12/2007 |
| JP | 9-275591 A | 10/1997 |
| WO | WO 2010/106476 A1 | 9/2010 |

OTHER PUBLICATIONS

Chinese Office Action dated Apr. 17, 2014 with English translation thereof {Sixteen (16) pages}.

* cited by examiner

RELAY DEVICE AND SPEAKER APPARATUS

BACKGROUND OF THE INVENTION

The present invention relates to: a relay device for relaying a light signal received from a remote operation device for remotely operating an external apparatus; and a speaker apparatus including the relay device.

Also in ordinary households, speakers have recently been connected to AV (Audio Visual) equipment such as television sets or players in many cases in order to reproduce realistic sounds. As an example of such speakers, a so-called "bar speaker", used by being placed in front of a television stand, has previously been proposed. The bar speaker is formed so that a plurality of speakers are arranged in a single housing having a bar-like shape. However, a television set is often provided at its lower part with a light receiver for receiving an infrared ray signal (hereinafter referred to as "infrared rays") outputted from a remote control device (hereinafter referred to as a "remote control"); hence, when the bar speaker is placed in front of the television set, the light receiver is hidden by the bar speaker, resulting in a problem that the television set cannot receive infrared rays from the remote control.

JP-A-09-275591 discloses a system capable of operating electronic equipment located at a position where a signal from a remote control does not reach the electronic equipment. The system disclosed in JP-A-09-275591 is configured so that a relay device (which may also be referred to as a "repeater device") for relaying a signal from the remote control is interposed between the remote control and AV equipment such as a television set and a VCR. Upon transmission of a signal from the remote control to the relay device by a user, the relay device transmits the signal, received from the remote control, to the AV equipment. Thus, even when the remote control and the AV equipment are located far away from each other, the user can operate the AV equipment by using the remote control.

However, the system disclosed in JP-A-09-275591 has problems that the relay device for relaying infrared rays must be prepared in addition to the bar speaker, and placement thereof cannot be easily carried out.

SUMMARY

It is therefore an object of the invention to provide a relay device and a speaker apparatus, the placement of which can be easily carried out when light responsive to a light signal such as received infrared rays is relayed to an external apparatus.

In order to achieve the object, according to the invention, there is provided a relay device comprising: a housing including: a first surface; and a second surface which is different from the first surface; a light signal receiving element operable to receive a light signal from outside, the light signal receiving element provided at the first surface of the housing; a light emission element operable to emit light responsive to the light signal received by the light signal receiving element; and a longitudinally elongated light guide member provided at the second surface of the housing, the light guide member to which the light emitted from the light emission element is incident, the light guide member including an emission part which causes the incident light to be emitted to outside from a lateral surface of the light guide member, the lateral surface which extends along a longitudinal direction of the light guide member.

The emission part may include reflection patterns which are provided so that a density of the reflection patterns is increased as the reflection patterns are located farther away from an incident position on which the light is incident, along the longitudinal direction.

The reflection patterns may be provided so that the density is exponentially increased along the longitudinal direction.

The housing may be formed with a groove which is defined by an opening formed at the second surface, a bottom surface parallel to the opening, and lateral surfaces extending between the opening and the bottom surface. The groove may include convex regions formed at a plurality of positions of the bottom surface along the longitudinal direction of the light guide member. The light guide member may be disposed on the convex regions.

The lateral surfaces of the groove may be each tapered toward the opening.

The lateral surface of the light guide member, from which the light is emitted to outside, maybe formed into an arc shape or a polygonal shape.

The light guide member maybe fixed in a sandwiched manner by using a screw.

The relay device may transmit, to a television set, the light from the lateral surface of the light guide member.

According to the invention, there is also provided a speaker apparatus comprising: the relay device; a sound signal receiving unit configured to receive a sound signal from outside; and a sound output unit configured to output, as a sound, the sound signal received by the sound signal receiving unit.

DETAILED DESCRIPTION OF EMBODIMENTS

Hereinafter, a relay device according to a preferred embodiment of the present invention and a speaker apparatus including the relay device will be described with reference to the drawings.

Figure 1A:
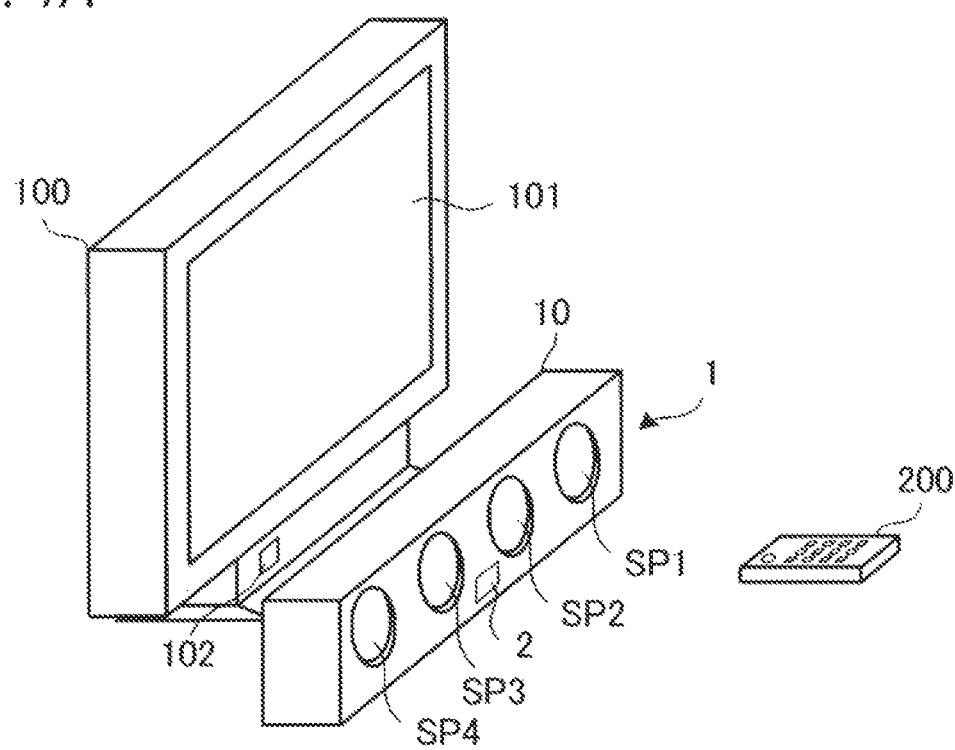
FIGS. 1A and 1B are diagrams illustrating how a bar speaker according to an embodiment of the present invention is placed.
Figure 1B:
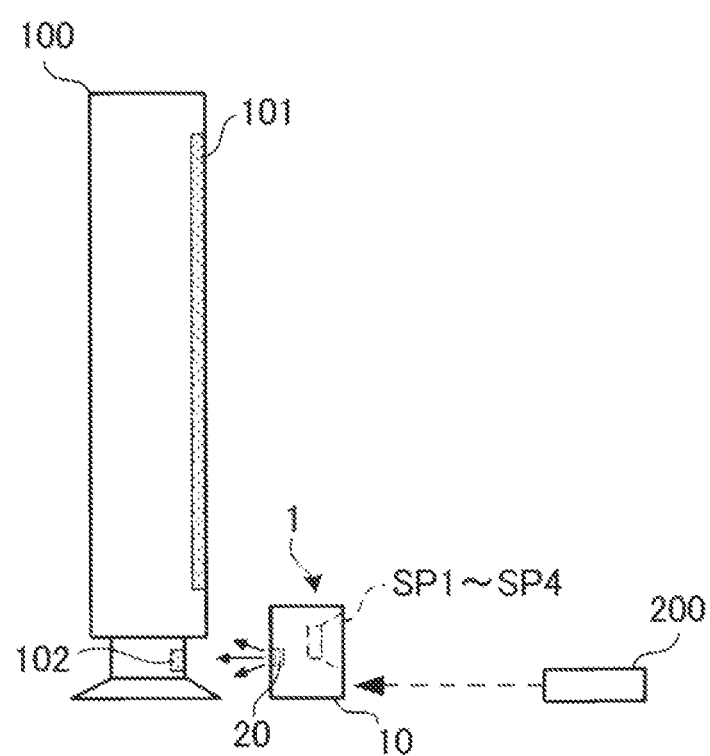

In the present embodiment, the relay device according to the present invention will be described as a bar speaker (speaker apparatus) 1 used by being placed in front of a television set. FIGS. 1A and 1B are diagrams illustrating how the bar speaker 1 according to the present embodiment is placed.

The bar speaker 1 is placed in front of a television set 100. More specifically, the bar speaker 1 is placed in front of a television stand of the television set 100 so that the bar speaker 1 and a display screen 101 of the television set 100 do not overlap one another in a height direction. FIG. 1A is a perspective view illustrating a state in which the bar speaker 1 is placed in front of the television set 100, and FIG. 1B is a side view thereof.

The television set 100 includes a light receiver 102 for receiving infrared rays (light signal) serving as an operation signal. The infrared rays received by the light receiver 102 are transmitted from a remote control 200 for the television set 100. The light receiver 102 is provided below the display screen 101. In the present embodiment, the bar speaker 1 is provided so that the bar speaker 1 faces a panel at which the light receiver 102 is provided. Hence, the light receiver 102 is blocked by the bar speaker 1, and the light receiver 102 cannot directly receive infrared rays from the remote control 200.

The bar speaker 1 has a rectangular parallelepiped housing 10 elongated in one direction. The bar speaker 1 is placed so that a longitudinal direction of the housing 10 corresponds to a width direction of the television set 100 and one surface (hereinafter referred to as a "rear surface") of the housing 10 faces the television set 100. In the following description, the longitudinal direction of the housing 10 is defined as a width direction of the bar speaker 1, and a vertical direction orthogonal to the width direction of the bar speaker 1 is defined as a height direction thereof.

The bar speaker 1 includes a plurality of speakers (sound output units) SP1, SP2, SP3 and SP4. The speakers SP1, SP2, SP3 and SP4 are provided at a surface (hereinafter referred to as a "front surface") of the housing 10, which is parallel to the rear surface (second surface) of the housing 10, so that the speakers SP1, SP2, SP3 and SP4 are arranged along the width direction. The bar speaker 1 is connected to the television set 100 via unillustrated wiring, thus receiving a sound signal from the television set 100 and emitting sounds forward from the speakers SP1, SP2, SP3 and SP4.

At a position located at an approximate widthwise center of the front surface (first surface) of the housing 10 and at a lower portion thereof in the height direction, the bar speaker 1 includes a light receiver 2 for receiving infrared rays from the remote control 200. The bar speaker 1 is placed so that a path between the light receiver 102 of the television set 100 and the remote control 200 is blocked. The bar speaker 1 receives, at the light receiver 2, infrared rays transmitted from the remote control 200 pointed at the television set 100.

Upon reception of infrared rays by the light receiver 2, the bar speaker 1 outputs the received infrared rays to the television set 100 from the rear surface of the housing 10 as indicated by solid arrows in FIG. 1B. In this case, the bar speaker 1 outputs the infrared rays in the form of a line along the width direction. As a result, even when a user has placed the bar speaker 1 without grasping a widthwise position of the light receiver 102 of the television set 100, the bar speaker 1 can allow the light receiver 102 to reliably receive the infrared rays.

Figure 2:
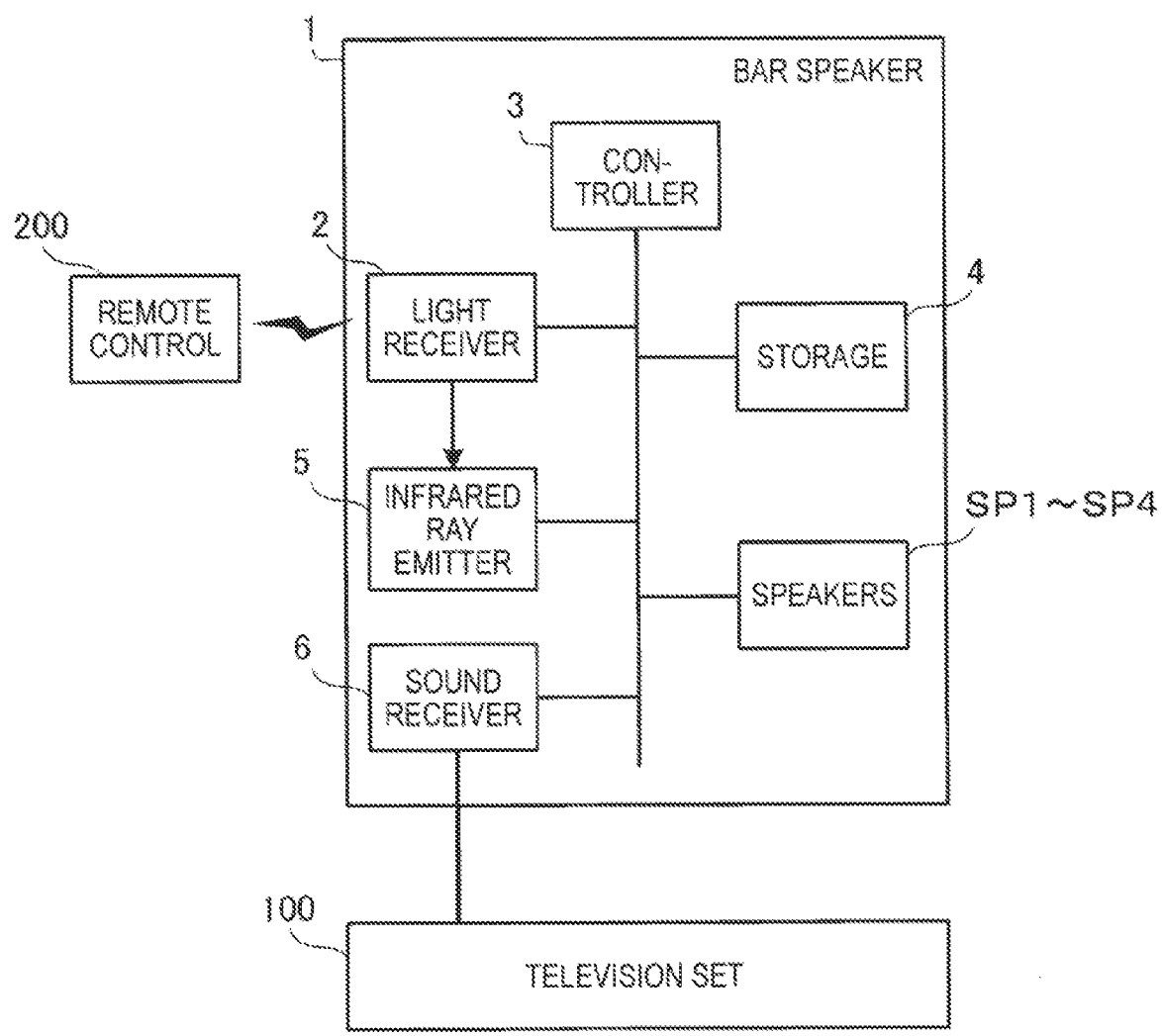
FIG. 2 is a block diagram illustrating a hardware configuration of the bar speaker.

FIG. 2 is a block diagram illustrating a hardware configuration of the bar speaker 1. The bar speaker 1 includes the light receiver 2, a controller 3, a storage 4, an infrared ray emitter 5, a sound receiver (sound signal receiving unit) 6, and the speakers SP1 to SP4.

The controller 3 executes a program stored in the storage 4, thereby controlling operations of the bar speaker 1. The storage 4 stores the program executed by the controller 3, and various necessary data.

The infrared ray emitter 5 re-emits infrared rays having the same information as that of infrared rays outputted from the remote control 200 and received by the light receiver 2. For example, when the remote control 200 has emitted infrared rays serving as a control signal for changing a sound level of the television set 100 and the bar speaker 1 has received the infrared rays, the infrared ray emitter 5 emits infrared rays serving as a control signal for changing the sound level of the television set 100. The infrared ray emitter 5 is provided adjacent to the rear surface of the housing 10, and upon emission of infrared rays by the infrared ray emitter 5, the infrared rays are emitted toward the television set 100 through a light guide rod described later.

The sound receiver 6 receives a sound signal from the television set 100. The sound signal received by the sound receiver 6 is emitted forward through the speakers SP1 to SP4.

Figure 3A:
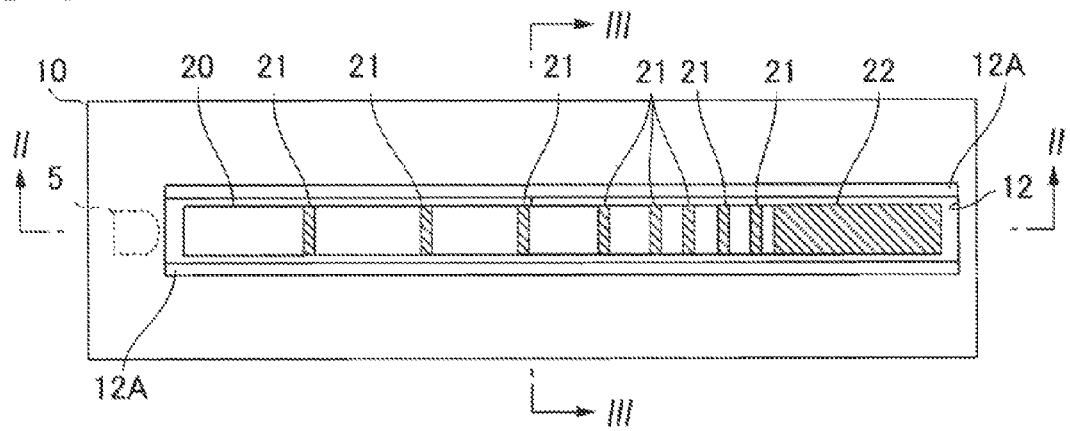
FIG. 3A is a rear view of a housing of the bar speaker.
Figure 3B:
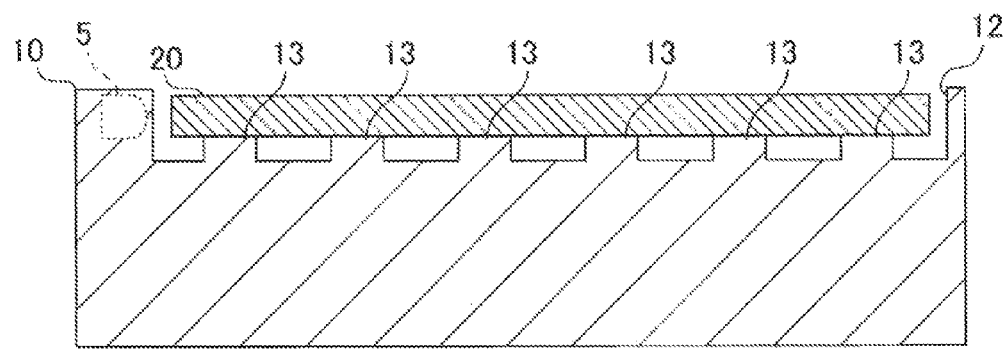
FIG. 3B is a cross-sectional view taken along the line II-II in FIG. 3A.
Figure 3C:
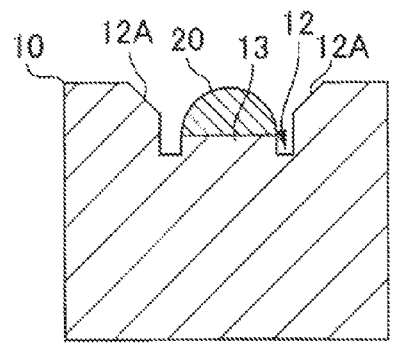
FIG. 3C is a cross-sectional view taken along the line III-III in FIG. 3A.

FIG. 3A is a rear view of the housing 10 of the bar speaker 1, FIG. 3B is a cross-sectional view taken along the line II-II in FIG. 3A, and FIG. 3C is a cross-sectional view taken along the line III-III in FIG. 3A.

As illustrated in FIG. 3A, the housing 10 of the bar speaker 1 is provided at its rear surface with a concave portion 12 having a rectangular opening elongated in the width direction of the bar speaker 1. The concave portion 12 has: a bottom surface parallel to the rear surface of the housing 10 (i.e., parallel to the opening); and lateral surfaces extending along the width direction. At the bottom surface of the concave portion 12, a plurality of convex regions 13 are formed at given intervals along the width direction. As illustrated in FIG. 3C, the lateral surfaces of the concave portion 12 are each perpendicular to the bottom surface of the concave portion 12 in the vicinity of the bottom surface, and are each tapered toward the opening in the vicinity of the opening. In the following description, the tapered surfaces will be referred to as "inclined surfaces 12A".

The bar speaker 1 includes a light guide rod 20 contained in the concave portion 12. The light guide rod 20 is a longitudinally elongated light guide member made of acrylic resin, for example, and extended along a longitudinal direction of the concave portion 12. The light guide rod 20 functions as the light guide member in which infrared rays emitted from the infrared ray emitter 5 are incident on one end of the light guide rod 20 (which will hereinafter be referred to as an "incident end") and the infrared rays are guided to the other end of the light guide rod 20 (which will hereinafter be referred to as an "emission end").

As illustrated in FIG. 3C, a cross section of the light guide rod 20, taken along a direction orthogonal to the longitudinal direction, is formed into a semicircular shape. An arc-shaped surface of the light guide rod 20 (which will hereinafter be referred to as a "lateral surface") is located adjacent to the opening of the concave portion 12, and a flat surface of the light guide rod 20 is put and fixed on the convex regions 13 of the concave portion 12. The light guide rod 20 is put on the convex regions 13, thus forming spaces between the flat surface of the light guide rod 20 and the bottom surface of the concave portion 12 as illustrated in FIG. 3B.

Note that heights of the convex regions 13 are not particularly limited as long as the light guide rod 20 put on the convex regions 13 does not come into contact with the bottom surface of the concave portion 12. Further, sizes of surfaces of the convex regions 13, which come into contact with the light guide rod 20, are not particularly limited but are preferably set so that a contact area between the surfaces of the convex regions 13 and the light guide rod 20 is minimized. Moreover, the number of the convex regions 13 provided at the bottom surface of the concave portion 12 maybe appropriately changed.

The infrared rays emitted from the infrared ray emitter 5 travel from the incident end of the light guide rod 20 toward the emission end thereof while causing total reflection through the light guide rod 20. In this case, since the light guide rod 20 is put on the convex regions 13 as mentioned above, gaps are formed between the flat surface of the light guide rod 20 and the bottom surface of the concave portion 12, thus reducing a contact area between the flat surface of the light guide rod 20 and the bottom surface of the concave portion 12. As a result, unexpected emission of infrared rays from the light guide rod 20, caused by refraction of infrared rays by a contact surface between the light guide rod 20 and the concave portion 12, is suppressed.

Furthermore, at a plurality of positions of the flat surface of the light guide rod 20, the reflection patterns 21 are provided. The reflection patterns 21 preferably have light-scattering reflective properties and are preferably printed, but the reflection patterns 21 may be provided by performing surface treatment on the flat surface of the light guide rod 20 so that irregularities are formed thereon. When the infrared rays, traveling through the light guide rod 20 while causing total refection therethrough, have impinged on the reflection patterns 21, irregular reflection occurs, and the infrared rays are emitted from the lateral surface of the light guide rod 20 so as to be spread out radially. In addition, the light guide rod 20 may be formed by mixing an impurity in acrylic resin or the like, thereby allowing infrared rays to be emitted from the lateral surface of the light guide rod 20.

In this embodiment, since the surfaces of the concave portion 12, which are located in the vicinity of the opening, are the inclined surfaces 12A, the infrared rays emitted from the lateral surface of the light guide rod 20 so as to be spread out therefrom can be prevented from being blocked by the lateral surfaces of the concave portion 12, and thus the infrared rays can be emitted not only in the direction of the normal to the rear surface of the housing 10 but also in the height direction.

As a result, even when the light guide rod 20 does not face toward the light receiver 102 of the television set 100 and there is a positional deviation therebetween in the height direction, the light receiver 102 can receive the infrared rays from the light guide rod 20.

Figure 4:
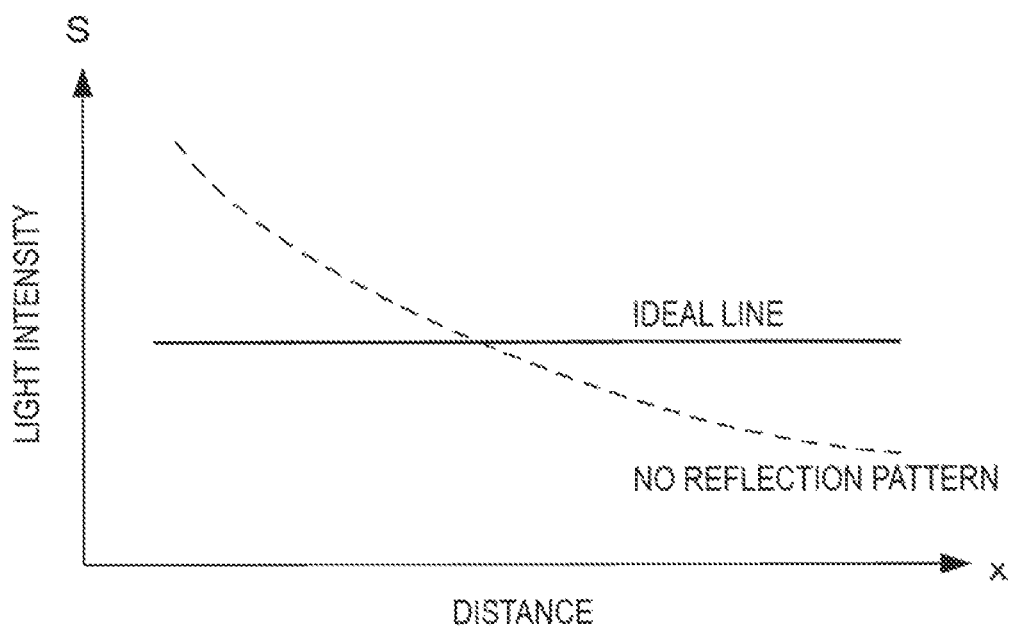
FIG. 4 is a graph schematically illustrating light intensities of infrared rays emitted from an arc-shaped surface of a light guide rod.

Hereinafter, a method for deciding an arrangement of the reflection patterns 21 will be described. FIG. 4 is a graph schematically illustrating light intensities of infrared rays emitted from the lateral surface of the light guide rod 20. In FIG. 4, a horizontal axis represents a distance x from the incident end in the longitudinal direction, and a vertical axis represents a light intensity S of infrared rays.

A dotted line in FIG. 4 indicates a light intensity of infrared rays at the distance x when the reflection patterns 21 are not formed. In this case, signal strength of infrared rays incident on the incident end is exponentially decreased from the incident end toward the emission end. In order to allow the light receiver 102 of the television set 100 to reliably receive infrared rays even when the light receiver 102 is located at any position in the width direction, the light intensity of infrared rays emitted from the lateral surface of the light guide rod 20 is preferably kept constant at all times irrespective of the distance x from the incident end, as indicated by a solid line in FIG. 4.

Therefore, a relationship between a density M of the reflection patterns 21 and the distance x from the incident end is considered as the following exponential equation: $M=Ae^{Bx}$. The higher the density M of the reflection patterns 21 is, the greater the light intensity S of the infrared rays emitted from the lateral surface of the light guide rod 20 is. When a coefficient A in the above-mentioned equation is reduced, the density M, i.e., the light intensity S, can be reduced in a case where the distance x is small. Further, when a coefficient B in the above-mentioned equation is increased, the density M, i.e., the light intensity S, can be increased in a case where the distance x is large. The coefficients A and B are adjusted in accordance with a material used for the light guide rod 20 or the type of the reflection patterns 21, thus allowing the light intensity S to be kept at a constant value irrespective of the distance x as indicated by the solid line in FIG. 4.

Note that in order to allow the infrared rays emitted from the light guide rod 20 to be kept constant irrespective of the distance x, the reflection patterns 21 are formed in a discrete manner; in addition, when the light guide rod 20 is formed by mixing an impurity in acrylic resin or the like, a concentration of the impurity to be mixed may be continuously changed.

Furthermore, a region of the flat surface of the light guide rod 20 located in the vicinity of the emission end thereof, e.g., an entire region of the flat surface extended between the emission end and a given position, is preferably uniformly provided with a reflection pattern 22 irrespective of the above-mentioned equation. Thus, infrared rays, which have been incident on the incident end and have reached the emission end without being reflected by the reflection patterns 21, can be reflected by the reflection pattern 22 and emitted from the lateral surface of the light guide rod 20 . As a result, infrared rays emitted from the infrared ray emitter 5 and incident on the light guide rod 20 can be emitted from the lateral surface of the light guide rod 20 without waste.

Figure 5:
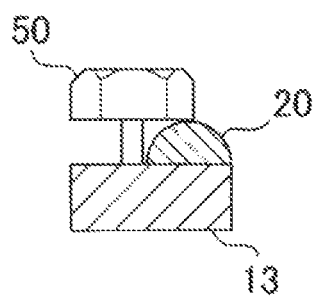
FIG. 5 is a schematic diagram illustrating a state in which the light guide rod is fixed by using a screw.

Note that a method for fixing the light guide rod 20 to the convex regions 13 is preferably performed as follows. A head of a screw, for example, is abutted against the lateral surface of the light guide rod 20 so that the light guide rod 20 is sandwiched and fixed between the head of the screw and the convex regions 13. FIG. 5 is a schematic diagram illustrating a state in which the light guide rod 20 is fixed by using a screw. In this case, a screw 50 is screwed into the convex region 13 (or the bottom surface of the concave portion 12) so that the light guide rod 20 is sandwiched and fixed between a head of the screw 50 and the surface of the convex region 13.

For example, when the light guide rod 20 is fixed by using a material such as a tape or an adhesive, tape regions might function as the reflection patterns 21 and 22, and infrared rays might be unfavorably reflected by the tape regions. Hence, the light guide rod 20 is fixed by using the screw 50 so that a contact area is reduced, thus making it possible to suppress unnecessary reflection of infrared rays.

Although the bar speaker 1 has been described above, the design of a specific structure of the bar speaker 1, for example, may be appropriately changed, and functions and effects described in the above embodiment are merely provided as the most preferred functions and effects derived from the present invention; therefore, the functions and effects of the present invention are not limited to those described in the above embodiment.

Figure 6A:
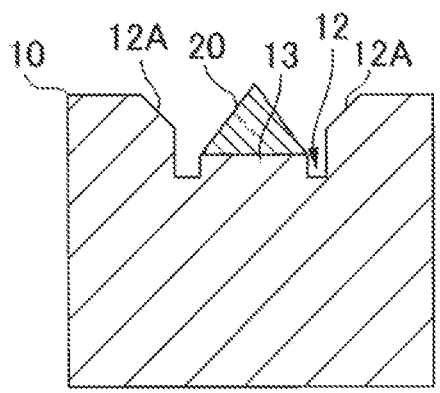
FIGS. 6A and 6B are diagrams illustrating other examples of cross-sectional shapes of the light guide rod.
Figure 6B:
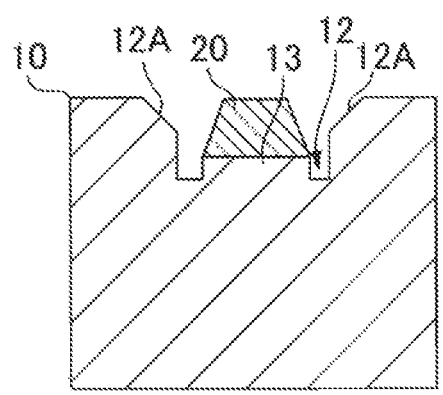

For example, the cross section of the light guide rod 20 is formed into a semicircular shape as illustrated in FIG. 3C in the above-described embodiment, but is not limited to this cross-sectional shape. FIGS. 6A and 6B are diagrams illustrating other examples of cross-sectional shapes of the light guide rod 20. The light guide rod 20 may have a triangular cross section as illustrated in FIG. 6A, or may have a trapezoidal cross section as illustrated in FIG. 6B. Moreover, although not illustrated, the light guide rod 20 may have a prismatic shape, i.e., a rectangular cross section, or may have a polygonal cross section.

Furthermore, although light emitted from the infrared ray emitter 5 is directly incident on the end of the light guide rod 20 in the above-described embodiment, the light emitted from the infrared ray emitter 5 may be incident on a position located somewhere along the light guide rod 20, or may be incident on the light guide rod 20 after having been reflected by a reflection member. In other words, the way the light emitted from the infrared ray emitter 5 is incident on the light guide rod 20 may be appropriately changed in accordance with the design.

According to an aspect of the invention, light responsive to the light signal received at the first surface can be emitted from the second surface. The light emitted from the second surface is emitted from the lateral surface of the longitudinally elongated light guide member, which is extending along the longitudinal diction thereof. Accordingly, when the relay device is placed in front of an infrared ray (light signal) light receiver of an external apparatus such as a television set, for example, the second surface is located to face toward the light receiver of the television set so that the longitudinal direction of the light guide member corresponds to a width direction of the television set, thus allowing infrared rays to be relayed to the light receiver of the television set.

According to an aspect of the invention, since signal strength of the light is reduced as the light gets farther away from the light incident position, the number of the formed reflection patterns is increased as the reflection patterns are located farther away from the incident position, thus emitting the light from the lateral surface of the light guide member even at positions located away from the incident position.

According to an aspect of the invention, the density of the reflection patterns is exponentially increased along the longitudinal direction, thus allowing a light intensity of the light, emitted from the lateral surface of the light guide member, to be uniform along the longitudinal direction. In this case, even when the light receiver of the television set is provided at any position in the width direction, infrared rays can be more reliably relayed to the light receiver of the television set. Placement of the relay device can be easily carried out because the relay device only has to be placed so that the longitudinal direction of the light guide member corresponds to the width direction of the television set, and therefore, time and trouble for the placement carried out by a user can be saved.

According to an aspect of the invention, spaces are formed between the light guide member and the bottom surface of the groove, thus making it possible to suppress useless refraction of the light through the light guide member.

According to an aspect of the invention, the light emitted from the light guide member can avoid being blocked by the lateral surface of the groove in the vicinity of the opening.

According to an aspect of the invention, the light is emitted from the arc-shaped or polygonal lateral surface of the light guide member, thus allowing the light to be emitted so as to be spread out radially. As a result, even when the light guide member is not located at the same position as a relay destination (e.g., the light receiver of the television set) in a height direction, the light can be relayed to the relay destination.

According to an aspect of the invention, the light guide member is fixed by using a screw. For example, when the light guide member is fixed by using a tape, the tape unfavorably functions as the reflection pattern; on the other hand, when the light guide member is fixed by using a screw, unexpected irregular reflection of the light can be suppressed in the light guide member.

According to an aspect of the invention, placement of a relay device can be easily carried out when light such as infrared rays is relayed to an external apparatus such as a television set, for example.

What is claimed is:

1. A relay device comprising:
    a housing including: a first surface; and a second surface which is different from the first surface;
    a light signal receiving element operable to receive a light signal from outside, the light signal receiving element provided at the first surface of the housing;
    a light emission element operable to emit light when receiving a signal outputted from the light signal receiving element; and
    a longitudinally elongated light guide member provided at the second surface of the housing, the light guide member to which the light emitted from the light emission element is incident, the light guide member including an emission part which causes the incident light to be emitted to outside from a lateral surface of the light guide member, the lateral surface which extends along a longitudinal direction of the light guide member.

2. The relay device according to claim 1, wherein
    the emission part includes reflection patterns which are provided so that a density of the reflection patterns is increased as the reflection patterns are located farther away from an incident position on which the light is incident, along the longitudinal direction.

3. The relay device according to claim 2, wherein
    the reflection patterns are provided so that the density is exponentially increased along the longitudinal direction.

4. The relay device according to claim 1, wherein
    the housing is formed with a groove which is defined by an opening formed at the second surface, a bottom surface parallel to the opening, and lateral surfaces extending between the opening and the bottom surface,
    the groove includes convex regions formed at a plurality of positions of the bottom surface along the longitudinal direction of the light guide member, and
    the light guide member is disposed on the convex regions.

5. The relay device according to claim 4, wherein
    the lateral surfaces of the groove are each tapered toward the opening.

6. The relay device according to claim 1, wherein
    the lateral surface of the light guide member, from which the light is emitted to outside, is formed into an arc shape or a polygonal shape.

7. The relay device according to claim 1, wherein
    the light guide member is fixed in a sandwiched manner by using a screw.

8. The relay device according to claim 1 which transmits, to a television set, the light from the lateral surface of the light guide member.

9. A speaker apparatus comprising:
    the relay device according to claim 1;
    a sound signal receiving unit configured to receive a sound signal from outside; and
    a sound output unit configured to output, as a sound, the sound signal received by the sound signal receiving unit.

* * * * *